United States Patent [19]

Nelessen

[11] Patent Number: 5,258,675
[45] Date of Patent: Nov. 2, 1993

[54] MOUNT APPARATUS FOR ROTATABLE APPARATUS COUPLED TO A ROTATING DRIVE UNIT

[75] Inventor: Jeffrey P. Nelessen, Merrill, Wis.

[73] Assignee: Marathon Electric Manufacturing Corporation, Wausau, Wis.

[21] Appl. No.: 776,200

[22] Filed: Oct. 15, 1991

[51] Int. Cl.⁵ ............................................ H02K 5/00
[52] U.S. Cl. ...................................................... 310/91
[58] Field of Search ...................... 310/91, 89, 273, 42, 310/67 R

[56] References Cited

U.S. PATENT DOCUMENTS

| | | | |
|---|---|---|---|
| 3,883,759 | 5/1975 | Mierendorf | 310/91 |
| 3,978,357 | 8/1976 | Voelbel et al. | 310/91 X |
| 4,841,183 | 6/1989 | Dohogne et al. | 310/91 X |
| 4,841,187 | 6/1989 | Hauke et al. | 310/89 X |
| 4,888,508 | 12/1989 | Adam et al. | 310/91 X |

FOREIGN PATENT DOCUMENTS 696104  8/1953  United Kingdom ................. 310/91

Primary Examiner—Steven L. Stephan
Assistant Examiner—E. H. To
Attorney, Agent, or Firm—Andrus, Sceales, Starke & Sawall

[57] ABSTRACT

A tachometer is mounted to an end frame of a motor. The end frame includes an end mount plate. An adjusting plate located within the recess and coupled to the mount plate through a plurality of radial coupling units and a plurality of axial spring loaded clamp units. Both coupling units are circumferentially spaced about the mount plate and the adjusting plate. Each radial coupling unit includes radial set screws in threaded openings in the mount plate and engage the periphery of the adjustment plate for radial positioning of the adjustment plate. Each axial coupling unit is a clamp unit located centrally between the radial coupling units, and each includes a clamp screw adapted to pass through a clearance hole in the adjusting plate and threaded into an appropriately threaded opening in the mount plate. A preload Belleville washer is located between the head of the clamp screw and the adjustment plate. Each clamp unit also includes a pair of axial set screws, located one to each side of the clamp screw. In assembly, a suitable indicator is coupled to the motor shaft and the position of the adjustment plate within the mount plate is accurately located in accordance with selected checking of angular positions of the adjusting plate with respect to the shaft axis. A particular sequence of setting the clamp screw units run-out condition is disclosed to establish a final run-out location of the adjusting plate which includes setting the axial positioning set screws and tightening the clamp screw to set the run-out essentially to zero.

12 Claims, 2 Drawing Sheets

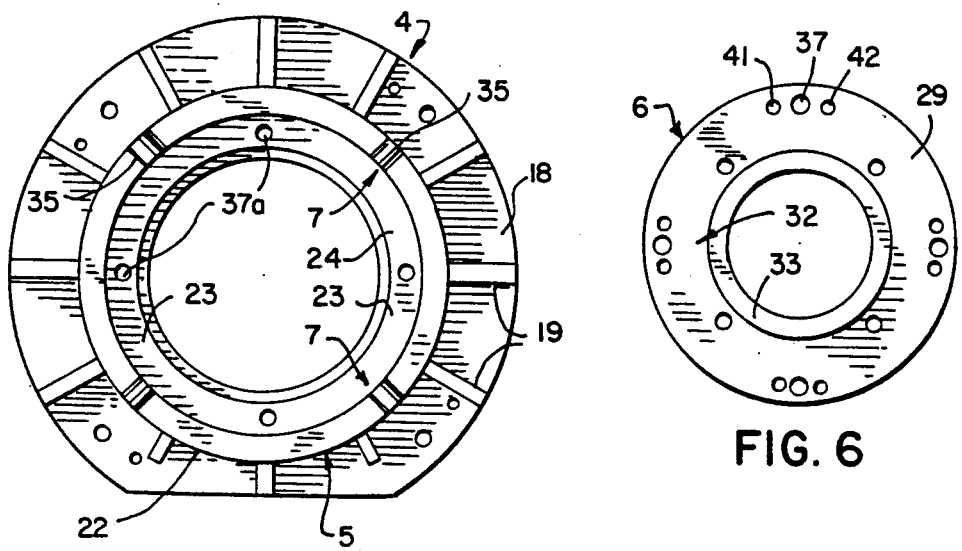
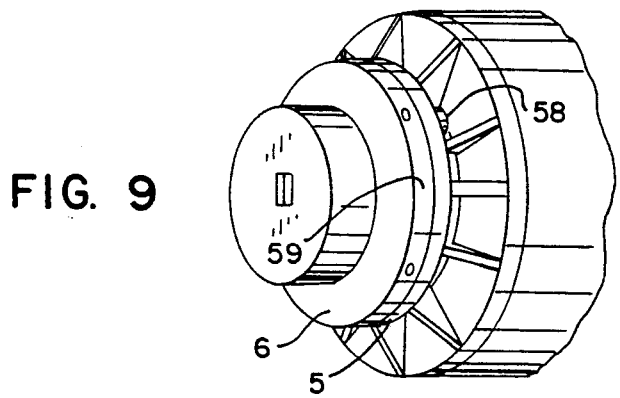
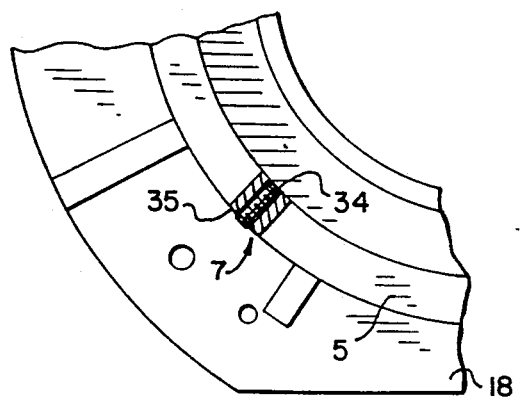
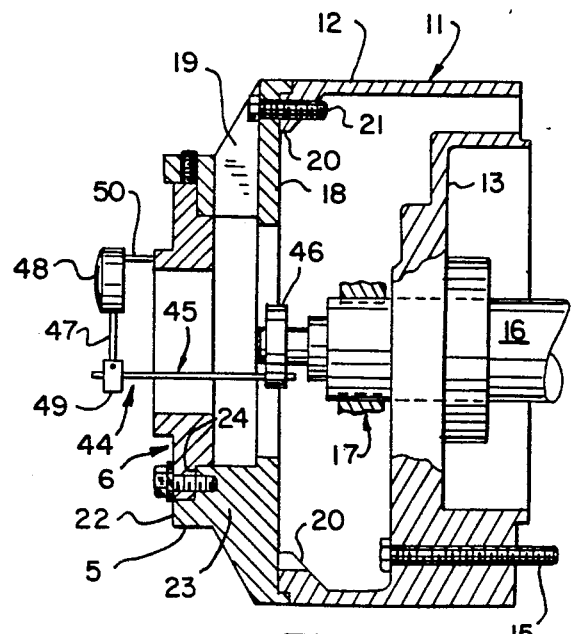

MOUNT APPARATUS FOR ROTATABLE APPARATUS COUPLED TO A ROTATING DRIVE UNIT

BACKGROUND OF THE PRESENT INVENTION

This invention relates to a mount apparatus for coupling a rotatable apparatus to the shaft of a rotating drive unit such as a dynamoelectric machine and particularly to the mounting of a tachometer or other related driven device to a rotary motor.

Motors and other dynamoelectric machines are constructed using an annular stator unit within a round main frame closed by end frames and a rotor rotatably mounted within the motor end frames. The rotor includes a rotor shaft which is supported in bearing in the motor end frames. In various motors, speed detecting devices or other control devices are mounted to the motor end frame and include a rotating member which is coupled to the motor shaft. Speed detecting devices may, for example, include a tachometer, an optical encoder or other similar device for detecting the speed of the rotor. Other devices which are often mounted to the motor and supported by the motor frame include brake devices, clutch devices, external fans and the like. Generally, the devices of interest herein have an outer member mounted in fixed relationship to the motor frame and a rotating member coupled to the motor shaft.

In various applications, accurate mounting of the auxiliary rotatable component or device is required to produce optimum operation and more particularly to prevent damage to the device and the coupling thereof during motor operation.

A particular application to which the present invention has been applied is the mounting of a tachometer to the end face or end frame member of an electric motor, and particularly totally enclosed, fan-cooled motors. In prior art systems, the end frame includes an annular mounting unit encircling the shaft structure with a mounting plate fixedly secured to the unit to support the tachometer with a rotating input member coupled to the motor shaft. In the mounting of tachometer and other motor-mounted and driven devices, the inventor has realized that the tachometer mount must have a total run-out within close specifications to insure proper operation and long life for the tachometer and coupling. Thus, the mounting unit should be accurately set for both radial run-out and axial run-out of the apparatus with respect to the motor frame to which the mounting unit is secured. Further, the mounting unit should provide a long life support generally corresponding to the anticipated motor life, and preferably permit a rapid and accurate attachment of the apparatus, and thereby provide a cost-effective mounting.

SUMMARY OF THE PRESENT INVENTION

The present invention is particularly directed to an improved mount apparatus or device for end mounting of a rotatable device to a dynamoelectric machine or like machine with the device accurately aligned and coupled to the rotating drive shaft of the machine. Generally, in accordance with the teaching of the present invention, the end frame unit of the motor is specially formed with an end mount plate. An adjusting plate member is coupled to the mount plate through a plurality of radial adjustment units and a plurality of axial adjustment securement units having axial adjusting elements specially oriented with respect to an attachment unit which in a preferred embodiment is a unique spring loaded unit.

More particularly in a practical construction for a fan-cooled and drip-proof motor, an end cover bracket unit is secured to the outer end of the motor and includes an outer annular mount plate. The mount plate is spaced outwardly of the motor with a central opening aligned with the motor shaft and an end coupling. The mount plate is accurately formed as an annular member with a recessed face defining a circular recess having a radial flange for receiving of an adjustment plate having a mating cross-section and a diameter relative to the diameter of the circular recess to permit radial positioning of the adjustment plate. The recessed mount plate is formed concentrically with the axis of the motor shaft. A plurality of equicircumferentially spaced radial attachment members such as set screws are radially threaded in correspondingly threaded openings in the overlapping periphery of the mount plate and the adjustment plate in axial alignment with the recess. The radial set screws provide for accurate radial positioning of the adjustment plate with respect to the motor axis.

The adjustment plate is firmly clamped within the mount plate using a plurality of circumferentially spaced clamping units within the radially overlapping walls of the mount plate and the adjustment plate. In the preferred construction, equicircumferentially spaced clamping units are provided and may be equal in number to the radial set screws and may be located centrally therebetween. Each clamping unit included a clamp screw adapted to pass through a clearance hole or opening in the adjusting plate and threaded into an appropriately threaded opening in the mount plate. A Belleville washer or other similar functioning resilient member is preferably interposed between a head member of the clamp screw and the outer face of the adjustment plate to provide for preloading of the clamp screw. In addition, each clamp unit includes a pair of axial positioning members such as axial set screws, located one to each side of the clamp screw. The pair of axial set screws of each clamp unit provide a balanced moment in contrast to the use of a single set screw for each fastening or clamp screw. The axial set screws are used to accurately position the adjustment plate with an appropriate final face run-out. In practice, the one set screw is positioned to provide essentially a minimal run-out condition and the opposite set screw is then set until the run-out condition changes. The clamp screw is then tightened to set the run-out essentially to zero. The spring washer distributes the clamping force to an outer diameter. The moment arm length between the set screw and clamping force is thus minimized. The minimal moment arm length further reduces deflection in the adjusting plate. The spring washer also provides improved adjustment capabilities by reducing the axial stiffness of the clamping system while maintaining the necessary contact pressure during adjustment of radial and face mount, and permits accurate and rapid setting of the system.

In assembly, a suitable indicator is coupled to the motor shaft and the position of the adjustment plate within the mount plate is accurately located in accordance with selected checking of angular positions of the adjusting plate with respect to the shaft axis. In one unique sequence with the adjusting plate only snugly clamped in place, a face run-out setting is made by adjusting one set screw of each clamp screw unit, lightly clamping the adjusting plate to the mount plate. The radial adjustment is then set by sequentially adjusting the two pairs of diametrically opposite radial set screws to a specified run-out position. The radial set screws are then torqued to their final specified value while maintaining the run-out specification. The individual face run-out clamp units are then torqued to the specified value by tightening the axial set screws and the clamp screw with the indicator reading kept at the minimum selected setting. Each clamping unit is so positioned, in sequence and torqued to the specified value. The actual face run-out is checked, and if the run-out is not within specification, the sequence is repeated until the specification is established. After the face run-out has been set, the radial run-out is again checked. If the radial run-out is not within specification, the clamping screw units must be released and the sequence repeated.

After the adjusting plate is accurately located with respect to the motor shaft, the tachometer or rotatable device is secured by attachment screws or otherwise appropriately secured to the adjusting plate with the rotating element thereof accurately and properly coupled to the motor drive shaft.

The mounting apparatus and the method of this invention provides a means of accurately attaching a rotating device within close specifications of the total radial and face or axial run-out, which has not been provided with prior art technology.

BRIEF DESCRIPTION OF THE DRAWINGS

The drawings herewith generally illustrate the best mode presently contemplated for the invention and are described hereinafter.

In the drawings:

FIG. 4 is an elevational view of an end cover unit taken on line 4—4 of FIG. 3;

FIG. 6 is an elevational view of an adjustment plate;

FIG. 7 is an enlarged fragmentary view of FIG. 4 more clearly illustrating a radial adjustment unit;

FIG. 8 is an enlarged vertical section with a run-out adjustment indicator mounted to the motor shaft unit; and FIG. 9 is a pictorial view of a motor with a modified mounting unit constructed in accordance with the present invention.

DESCRIPTION OF THE ILLUSTRATED EMBODIMENT

Figure 1:
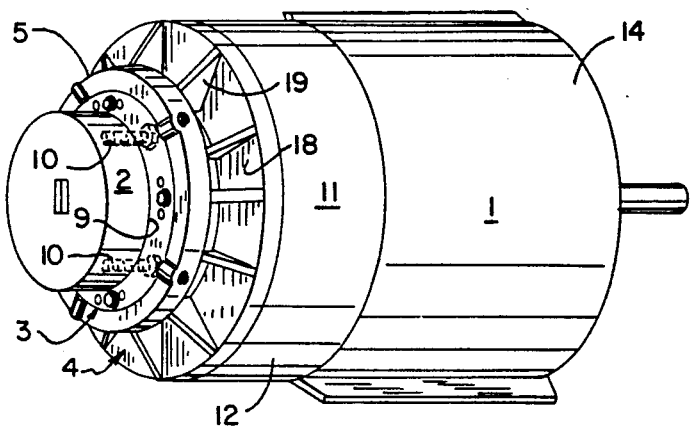
FIG. 1 is a pictorial view of a motor and tachometer mounted with a mount apparatus constructed accordance with the present invention.

Referring to the drawings and particularly to FIG. 1, a typical electric motor 1 of a totally enclosed fan cooled structure is illustrated. A tachometer 2 is mounted to the one end of the motor 1 for monitoring the speed of the motor. In accordance with the present invention, a special adjustment unit 3 is interposed between the tachometer 2 and an outer end cover unit 4 of the motor 1. The adjustment unit 3 is secured to a mount plate 5 which is interconnected to and forms a part of the end cover unit 4. Generally, unit 3 includes an adjustment plate 6 secured to the plate 5 by radial adjustment units 7 and axial adjustment and clamp units 8. Mount plate 5 includes the plurality of similar radial adjustment units 7 which control the radial run-out of the plate 6 for providing radial alignment of the axii of the tachometer 2 and motor 1. In addition, unit 3 also includes the plurality of face or axial adjustment and clamp units 8 which adjust the axial or face run-out of the adjusting plate 6. The tachometer 2 has a finished mounting face 9 on the housing which is rigidly affixed to the adjusting plate 6 as by a plurality of clamping screws 10 whereby the total radial and axial run-out of the tachometer 2 is precisely set in accordance with the positioning of the adjustment plate 6 on mount plate 5.

The present invention is particularly directed to the adjustment unit 3, and a preferred embodiment is particularly illustrated in the drawings.

In the illustrated embodiment as shown in FIGS. 3 through 8, the fan-cooled motor includes an end bracket unit 11 with an integral shroud 12. The bracket unit 11 includes an integral end shield 13 secured to one end of shroud 12 and secured to the main motor frame 14 as by screws 15. A motor shaft 16 is journaled in end shield 13 and extends into shroud 12. A fan 17 is mounted to the motor shaft 16 within the shroud 12. The shaft 16 extends outwardly of the fan 17 and terminates within the cover unit 4 which is secured to the outer end of shroud 12.

The end bracket unit 11 is illustrated as a single cast unit providing a high strength support structure for enclosing the fan 17 and for rigidly supporting the tachometer 2, as well as any other component such as brakes, external fan units and the like which is secured to the end cover unit 4. The end bracket unit 11 was developed by the assignee of this application and is disclosed as a part of the best embodiment.

The end cover unit 4 consists of a guard plate 18 and the outer mount plate 5 to which the adjustment plate 6 is secured. The mount plate 5 and guard plate 18 in the illustrated embodiment of the invention are formed as an integral cast member with a plurality of circumferentially distributed interconnecting ribs 19 forming a single integrated rigid structure. The guard plate 18 is secured to the outer ring member 20 of shroud 12 by screws 21 and provides a rigid mounting thereof. The mount plate 5 is located outwardly by the ribs 19 and has a diameter somewhat less than the diameter of the guard plate 18. The end cover unit 4 has appropriate openings through the ribs 19 for permitting air flow between the ribs through the units 4 and 11, for forced air flow over the motor.

Figure 3:
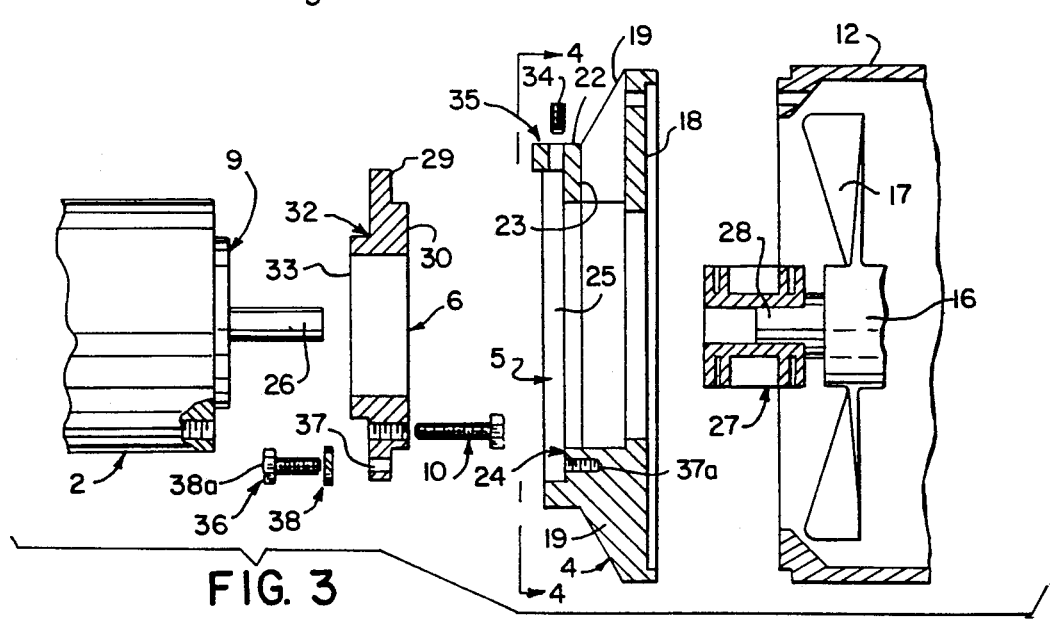
FIG. 3 is an exploded sectional view taken generally on line 3—3 of FIG. 2 and illustrating the mounting apparatus shown in FIGS. 1 and 2.

As more clearly shown in the exploded view of FIG. 3 and detail views FIGS. 4–7, mount plate 5 is formed with a generally L-shaped cross section defining an outer ring 22 and an inwardly projecting radial flange 23 having an axially outer finished face 24. The ring 22 and flange 23 form a recess within which the adjustment plate 6 is physically clamped by the plurality of radial adjustment unit 7 and the plurality of axial adjustment and clamp units 8. The axially outer finished face 24 provides a flat inner wall with a central opening 25 for passage of the tachometer shaft 26 into a coupling 27 secured to the motor shaft 16.

The motor shaft 16 is specially constructed with the outermost end having a slightly reduced diameter and defining a coupling stub shaft 28 for interconnection of auxiliary rotary equipment such as the tachometer 2. Coupling 27 is an annular coupling affixed as by a set screw or the like, not shown, to the stub shaft 28 and projects axially therefrom to receive the shaft 26 of the tachometer which is similarly secured thereto. The accurate alignment of the tachometer motor shaft is required to obtain a precise signal from the tachometer. The shaft alignment is also necessary to avoid premature failure of the coupling.

The run-out adjustment plate 6 is formed with complementing and thus a reverse L-shaped cross sectional configuration to that of the mount plate 5. The adjustment plate 6 is an annular plate having a central shaft opening. The outer circular portion has an L-shaped configuration defining an outer flange 29 and an inner ring 30 adapted to mate within the recess of the mount plate 5. The inner ring 30 projects from the flange 29 and provides a relatively thick mounting portion to which the tachometer 2 is secured as by the plurality of screws 10.

In the illustrated embodiment, the adjustment plate 6 has a rabbet 32 with an axial outer finished flat face 33 to which the finished face 9 of tachometer 2 is attached as by the four equicircumferentially spaced connecting screws 10. The flat face 33 must be accurately located in a plane essentially perpendicular to the axis of the motor shaft 16.

The tachometer shaft 26 must be aligned with the center axis of the motor shaft 16. The radial run-out adjustment and setting is made through the circumferentially distributed radial adjustment units 7. (FIG. 7). In the illustrated embodiment of the invention, the radial run-out adjustment units 7 include four equicircumferentially spaced set screws 34 located to engage and radially secure the plate 6 within the mount plate 5. The mount plate 5 at the location of each set screw 34 is shown formed with an outer face enlargement 35 to accommodate the set screws in alignment with plate 6, as more fully set forth hereinafter.

The face run-out or axial adjustment and clamp units 8 include four equicircumferentially spaced units, one each centrally between the set screws 34. Each of the clamp screw units 8 includes a clamp screw 36 which passes through an opening 37 in the flange of the adjustment plate 6 and threads into a suitable threaded opening 37a in the mount plate 5. The four clamp units 8 and particularly the clamp screws 36 are shown aligned with four of the equicircumferentially spaced bracket ribs 19. These ribs 19 may be formed with a sufficient width or thickness with threaded openings as shown to receive the clamp screws 36 and provide the secure threaded attachment of the clamp screws and plate 6 to the mount plate 5. In addition, a resilient preload member shown as a spring washer and particularly Belleville washer 38 is shown located between the head 38a of the screw 36 and the plate 6 to preload the plate during the assembly. Uniformly spaced to each side of the clamp screw 36 and spring washer 38, a pair of run-out adjusting set screws, including a counterclockwise set screw 39 and a clockwise set screw 40, thread into correspondingly threaded openings 41 and 42 extended through the flange 29 of the adjustment plate 6. The set screws 39 and 40 are placed into bearing engagement with the axially outer finished face of the recessed flange 23 in the mount plate 5 for precise setting of the face run-out of the adjustment plate 6. The two set screws 39 and 40 provide a balanced loading relative to the clamp screw 36 and spring Washer 38 in the setting of the plate 6.

The radial set screws 34 of the mount plate 5 are threaded into engagement with the periphery of the outer flange 29 of the adjusting plate 6 and through a sequential adjustment serve to accurately center the adjusting plate within the mount plate 5 and in precise relationship to the axis of the motor shaft to provide an appropriate radial run-out.

The adjustment plate 6 is precisely located and secured to mount plate 5 with the tachometer 2 removed from the adjustment plate 6 to provide precise coincidence between the axis of the adjustment plate 6 and axis of the motor shaft 16. Generally, the adjustment plate 6 is located with the face run-out adjusted to the specified run-out, with the clamp screws 36 only holding the plate snugly in place. The radial run-out is set and clamped to the specified torque, and the face run-out then reset to the specified run-out position and the clamp screws drawn up to a final clamping torque. The radial and face run-outs are finally checked to insure the required precision setting of the adjustment plate 6. If not properly set, the clamp screws are released and the run-out adjustment procedure is repeated.

More particularly referring to FIG. 8, a preferred mounting method is shown in which a reference dial indicator unit 44 is coupled to the motor shaft 16 and located outwardly of plate 6. A rod-like sleeve 45 is secured to the motor stub shaft 28 with clamp 46, with coupling 27 removed, and projects axially outwardly through the center opening of the adjustment plate 6. A clamp 49 secures an indicator rod 47 to sleeve 45. The rod 47 extends radially adjacent to plate 6 and particularly the outer finished rabbet 32. An indicator 48 is clamped to the outer end of rod 47 and includes a sensing arm or finger 50 projecting from the dial indicator 48 for engagement with the plate 6 and particularly rabbet 32.

In the assembly of the adjustment plate 6, the plate 6 is first assembled and clamped within the recess by the clamp units 8 with a snug fit to preload the plate 6. The face adjustment axial set screws 39 and 40 and the radial set screws 34 at first are not tightened and loosely engaged with the face of the recess flange and the periphery edge of the outer ring of the adjusting plate 6.

A rough adjustment of the face run-out is first established to provide a perpendicular relationship between the face 24 of adjusting plate 6 and the motor shaft axis, as follows.

The sensor finger 49 of the dial indicator 48 is located in engagement with the flat face 33 on the adjustment plate 6. The dial indicator 48 is moved in alignment with a clamp screw 36 and positioned to a face run-out reading a given short distance, such as approximately 0.25 inches, radially outwardly from the adjusting plate rabbet opening and clamped in position. The indicator 38 is moved to determine the positive displacement, which is generally considered to be movement away from the motor. The indicator 38 is then in position to read each of the circumferentially spaced positions in alignment with each clamp screw, noting the positive and negative values. The indicator unit 45 is then rotated to the largest positive displacement; indicating the maximum face run-out, and reset to 0.00, using either one of the two positioning screws 39 or 40. The indicator is then moved to the other clamp unit 8 which are similarly reset to zero. In adjusting the other clamp units 8 to zero, the same set screw as used at the largest positive displacement, either the counterclockwise set screws 39 or the clockwise screw 40, is adjusted as by tightening until the indicator reads 0.00. For purposes of description, the clockwise screw 40 is selected as the first adjusting screw. This latter procedure may require loosening of the clamp screws 36 slightly.

The radial adjustment is then made using the dial indicator unit 45 to establish proper radial run-out, as follows.

Figure 2:
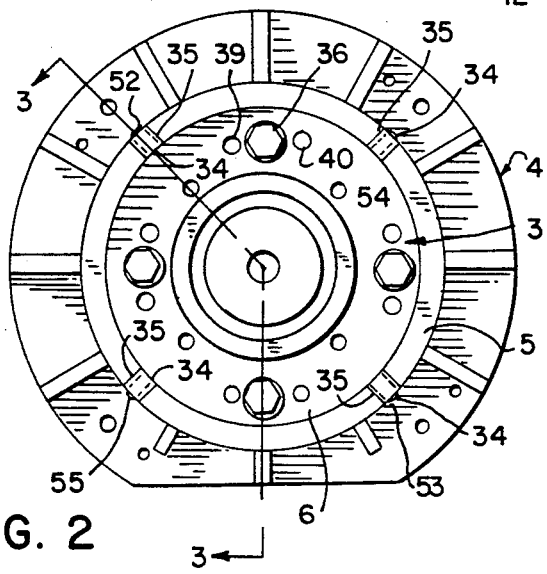
FIG. 2 is an end view of the unit shown in FIG. 1 with the tachometer removed.
Figure 5:
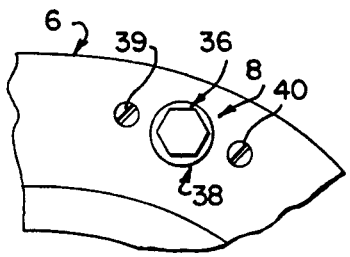
FIG. 5 is an enlarged fragmentary view of FIG. 4 more clearly illustrating the axial adjustment unit.

The sensor finger 50 engages the finished axial wall 51 of rabbet 32, shown as an inner axial wall which must be centered with the axis of the motor shaft. The indicator 48 is rotated to alignment with a given set screw 34, shown as the set screw 34 at position 52 in the upper left corner of the assembly in FIG. 2. The indicator is zeroed at position 52 and establishes the reference position. The indicator 48 is then rotated 180° into alignment with the oppositely and diametrically located set screw 34, at position 53 in FIG. 2. The indicator 48 reading at position 53 is reset equal to one-half the original reading at position 53 and the set screws 34 are tightened to zero the indicator and clamp the adjustment plate radially. The radial set screws 34 at 90° to those at positions 52 and 53, shown as positions 54 and 55 in FIG. 2, are then similarly adjusted until the indicator reads 0.00 and clamped into place.

To check the accuracy of the radial setting, the dial indicator 48 is repositioned to locate the sensor finger in alignment with the first set screw 34 at position 52. If the reading is within an appropriate tolerance such as 0.001 inches, the setting is acceptable. If the reading is not within specification, the sequence of steps is re-executed beginning with the setting of the indicator 48 at zero at the reference position 52. Generally, when the proper setting has been obtained, it is recommended that one screw is slightly overtightened to overshoot the 0.00 dial value and then the setting is brought back to the 0.00 position by tightening of the diametrically opposite set screw. This step is repeated until the set screws are torque to the specified value. After such adjustment is made at the first diametric position, the dial indicator 48 is moved to one of the other radial set screw positions 54 or 55 on the diametric line at 90° to that of the first setting. The set screws at these positions are set through a similar sequence of adjustment to establish the 0.00 reading within the acceptable tolerance and thereafter the radial set screws on the second diametric line are torqued to the specified value such as 15 foot-pounds with the indicator at the 0.0 reading. If the total indicated radial run-out is within the specification, such as less than or equal to 0.004 on the adjusting plate, the radial adjustment is acceptable. If for any reason the total indicated run-out is greater than the accepted limit such as 0.004 inches, the total radial adjustment of the plate 6 is repeated.

After the radial adjustment, the face run-out of the plate 6 which was previously adjusted to be substantially perpendicular to the shaft axis is clamped to its final position by torquing clamp screw 36 to a specified torque value, as follows.

The indicator 48 is again moved with the finger 50 located on the finished flat face 33 in alignment with a clamp screw 36 to read the face run-out approximately 0.25 inches radially outwardly on the adjusting face 33. At this position, the indicator is set at 0.00. The final clamping of the unit 8 is made by the use of the pairs of set screws 39 and 40 at each of the clamp unit, as follows.

At the first selected position, the counterclockwise set screw 39, in FIG. 2, which is the opposite of the clockwise set screw 40 arbitrarily selected in the initial setting, is tightened until the indicator 48 establishes a selected reading such as 0.001. The clockwise set screw 40 is then tightened until the indicator 48 just begins to move. A torque wrench, not shown, is then applied to the clamp screw 36 and the clamp screw is tightened down until the indicator 48 has returned to the zero position. The same clamp sequence is continued at this position by reducing the indicator reading by half the previous movement until the specified torque required to tighten the clamp screw 36 is obtained, such as between 25 and 30 foot pounds.

Thereafter, the indicator 48 is sequentially positioned at each of the other three units 8 and the same sequence is followed until each of the clamp screw 36 is set to the specified torque.

A final check of both the axial face run-out and the radial run-out are then checked. If the total indicated run-out after completing the sequence is less than the selected tolerance such as 0.004 inches, the final assembly proceeds. If the value is greater than 0.004 inches, the previous final adjustment steps must be re-executed and the total indicated readout again checked.

The above sequence is first completed until the total radial run-out is within the accepted specifications.

Once within such specification, the indicator is then moved to check the radial run-out. If the total indicated radial run-out is within the tolerance, that is, less than or equal to 0.004 in the example, the setting is complete and the tachometer 2 is mounted.

If the total indicator radial run-out is now greater than the tolerance of 0.004, the clamp screws 36 are again loosened and the radial run-out adjustment procedure re-executed and the clamp screw is set to a torque of 28 foot-pounds.

Whenever the adjustment for the radial run-out has to be re-executed or reset, then the final face run-out adjustment must also again be checked by recording of the total indicated run-out to make sure that the run-out was in the tolerance specification. If the face run-out is not within the tolerance, then the appropriate procedure is followed by re-executing of the prior steps for the final adjustment face run-out.

By the following of the described procedure, the adjusting plate is accurately located with the rabbet face positively located concentrically of the motor shaft and with the face perpendicular to the axis. The mounting of the tachometer or other rotating device to the finished face thus provides an appropriate mounting of the tachometer; with coupling of the tachometer shaft to the motor through the unique mounting apparatus establishing a long and reliable connection.

FIG. 9 illustrates an alternate embodiment in which a face run-out or axial adjustment unit 58 is mounted on the back side of the mount plate 5. In this embodiment, the adjustment plate 6 has a radial flange 59 abutting the corresponding outer portions of plate 5 in alignment with the unit 58. The embodiment may otherwise be constructed as the first embodiment.

Various other embodiments may be made incorporating other separate radial and face run-out adjusting device, as well as variations of the special resiliently-loaded and moment balanced securement means.

In summary, the adjustment plate element and the mount element with appropriate overlapping radial and axial portions to receive the multiple radial adjustment units and the multiple axial and face run-out adjustment units are required and may be of any suitable construction. The illustrated embodiment is a preferred embodiment which is particularly suited to cost effective production of rugged and long life structure. Further, the system may be automated with a suitable indicator for sensing the position of the reference surfaces on the adjustment plate and appropriate devices for setting of the radial adjusting elements and the axial adjusting elements.

In the construction of the apparatus, the spring loading of the clamping bolt can be eliminated. In this system, the same sequence would be applied with a relatively loose attachment of the clamping bolts initially followed by the setting of the adjustment screws. The spring-loaded structure is preferred to permit a more rapid setting of the unit as well as providing improved load distribution and a prompt and accurate adjustment of the mounting assembly.

Although the radial and axial adjustment units are shown including four equalized circumferentially spaced units with the radial and axial units rotated relative to each other, this arrangement is not critical or particularly significant. Thus, the elements can be more or less arbitrarily positioned. With respect to the face run-outs, three adjustment units define a necessary plane and may be used. Additional run-out adjustment units can of course be provided if a more precise adjustment is considered necessary. Further, although the adjustment plate is located within the recessed portion of a mounting plate, a reverse overlapped surface orientation can be used with the mount plate projecting into a recess in the adjustment plate to provide the radially overlapping walls and surfaces and the axially overlapping walls and surfaces.

Various modes of carrying out the invention are contemplated as being within the scope of the following claims particularly pointing out and distinctly claiming the subject matter which is regarded as the invention.

I claim:

1. A mounting apparatus for securing a component having a rotatable member mounted within a support to a dynamoelectric machine having an outer frame and having a rotating output shaft adapted to be secured to said rotatable member, comprising a mount member with a center shaft opening secured to said outer frame, said mount member including a radial surface and an axial surface, an adjustment member having a radial surface and an axial surface aligned with said radial surface and axial surface of said mount member, radial coupling units connected to said mount member and said adjustment member and having radially movable members to adjust the position of said adjustment member relative to said mount member and said shaft opening, face coupling units connected to said mount member and to said adjustment member and having axially moveable members to adjust the position of the adjustment member relative to said radial surface and the axial position relative to said mount member and to secure the adjustment member in fixed axial relation to said mount member, said radial coupling units and said face coupling units permitting accurate setting of said adjustment member relative to said shaft opening for securing said component to said dynamoelectric machine with a desired radial run-out and face run-out during rotation of said output shaft of said dynamoelectric machine.

2. The apparatus of claim 1, wherein said radial surface and said axial surface of said adjustment member are finished surfaces whereby said face coupling units and said radial coupling units accurately locate said adjustment member relative to said output shaft.

3. The apparatus of claim 1 wherein said radial coupling units are secured to said aligned axial surfaces and include said radially movable members secured to one of said aligned surfaces and engaging the other of said aligned surfaces to radially adjust the position of said adjustment member relative to said mount member; and said face coupling units are secured to said radial aligned surfaces and include said axially movable members secured to one of said radial aligned surfaces and engaging the other of said radial aligned surfaces to axially adjust the position of said adjustment member relative to said mount member.

4. The apparatus of claim 2, wherein said axially movable member of each of said face coupling units includes a clamp member secured to said adjustment member and said mount member and a pair of positioning members circumferentially spaced one to each side of said clamp member.

5. The apparatus of claim 4, including a resilient member coupled to said clamp member to preload the clamp member and establishing balanced deflection and loading on said positioning members adjacent the clamp member.

6. The apparatus of claim 5, wherein each of said clamp members is a clamp screw member having an integral head, said mount member having threaded openings to receive said clamp screw member for clamping said adjustment member to said mount member, said resilient member includes a spring washer located between the head of said clamp screw member and said adjustment member, and said positioning members being set screw members threaded in said adjustment member and engaging said mount member.

7. The apparatus of claim 2, having an end bracket unit including an annular shroud and an end shield member integrally formed within one end of said shroud, said end shield member being essentially a substantially continuous plate-like member having a center bearing hub for supporting of the output shaft of said machine and connected to the shroud at one end of said shroud, said shield member including a plurality of circumferential openings adjacent so said shroud and spaced outwardly substantially from said hub, said end bracket unit being formed of a cast metal as a single piece integral member of a high strength cast metal, said shroud projecting axially outwardly of said end shield member to an outermost end and defining a space surrounding said output shaft, a rotating fan unit secured to said output shaft within said shroud, and said mount member being secured to said outermost end of said shroud to support the component on said shroud.

8. A mounting apparatus for securing a rotary control component having a rotating input shaft mounted within a component frame to a rotary motor having a round main frame having an open end and a motor shaft supported within said motor main frame, and said input shaft having an axis and said motor shaft having an axis, said input shaft being connected to the motor shaft, comprising a mount plate adapted to be secured to the open end of said main frame and having a center shaft opening aligned with the motor shaft, an adjustment plate abutting said mount plate, said mount plate and adjustment plate having axial overlapping portions, radial set screws connected to said mount plate and movable into engagement with said adjustment plate to radially adjust the position of said adjustment plate relative to said mount plate, said plates having radial overlapping faces, and end face coupling units connected to said mount plate to adjust the axial position of the adjustment plate face perpendicular to the axis of said rotating input shaft and to fix said adjustment plate relative to said mount plate.

9. The apparatus of claim 8, wherein each of said end face coupling units includes a spring loaded clamp screw passing through an opening in said adjustment plate and threaded into said mount plate, and a pair of positioning screws threaded through the adjustment plate into bearing engagement with the mount plate and circumferentially spaced one to each side of said clamp screw and set to establish a balanced deflection and loading on said adjustment member adjacent the clamp screw.

10. The apparatus of claim 9, wherein said spring loaded clamp screw has an outer screw head and a spring washer located between said head and said adjustment plate.

11. A mounting apparatus for inter-connecting of a driven rotary unit to a driving rotary unit, each of said driven rotary unit and said driving rotary unit having a frame structure and a rotating shaft element having an axis, said frame structures having adjacent ends, comprising a mount plate adapted to be rigidly secured to the end of the frame structure of the driving rotary unit and having an opening concentric with said shaft element of said driving rotary unit, said mount plate having a circular recess with an axis coincident with the axis of said shaft element of said driving rotary unit and said recess having an outer circular ring and a finished radial flange extending inwardly of said circular ring, an adjusting plate having an outer finished ring and an inwardly projecting flange mating with said recess and said circular ring and said finished ring having slightly different diameters permitting movement of said adjusting plate relative to said mount plate, said flange of said adjusting plate having an outer finished face adapted to rigidly support the driven rotary unit with the axis of its shaft element coincident with said shaft element of said driving rotary unit, a plurality of radially mounted set screws threaded in one of said rings of said mount plate and said adjusting plate in alignment with the other aligned ring, a plurality of axially adjustable clamp screw units secured to one of said flanges of said adjusting plate and said mount plate, said clamp screw units each including a clamp screw adapted to project through said adjusting plate and secured to said mount plate, each of said clamp screws having an outer head member, a spring washer interposed between said head member and said adjusting plate and spring loading the interconnection between said clamp screw and said adjusting plate and the washer having an outer edge located outwardly of the head screw of the clamp member, each of said clamp screw units further including a pair of axial adjustment set screws located one to each side of said clamp screw immediately adjacent to the outer edge of said spring washer, whereby said adjustment set screws are adjustable into engagement with said flange of said mount plate for locating of said adjusting plate axially of said shaft element of said driving rotary unit and with said pair of set screws providing a balanced moment loading on said clamp screw, and radially mounted set screws and said clamp screw and said axial adjustment set screws being adjusted to establish the respective radial run-out and face run-out of said adjusting plate and said clamp screws being tightened to a predetermined torque level to firmly interconnect said adjusting plate to said mount plate.

12. In a motor having a substantially round main frame having at least one open end, a bracket unit secured to said open end and including an outer annular shroud and an end shield integrally formed to one end of said shroud, said shield being an essentially continuous plate-like structure spanning said shroud and including a central bearing hub with outer air openings, said shroud having a mounting edge abutting said open end of said main frame to form a continuation thereof, said motor having a motor shaft journaled in said bearing hub and extending therefrom into said shroud, said motor shaft having an axis of rotation, a fan unit mounted to said shaft within said shroud, said shroud projecting outwardly of said fan unit to an outer end face, an outer cover unit including a guard plate secured to the outer end face of said shroud and an outer mount plate connected to said guard plate, an adjustment unit including an annular adjustment plate secured to said mount plate, a tachometer secured to said adjustment plate and having a rotating shaft with an axis of rotation and connected to said motor shaft, said adjustment plate and said mount plate having overlapping axially extended surfaces of slightly different diameters and having opposed radially extended surfaces, radial adjustable elements connected to said overlapping axially extended surfaces and operable to position said adjustment plate within said mount plate for aligning the axis of said adjustment plate with the axis of said motor shaft, and axial adjustable elements connected to said overlapping radially extended surfaces and operable to position said adjustment plate within said mount plate with the adjustment plate having an outer radial face in a plane perpendicular to the axis of the motor shaft, said radial adjustable elements and said axial adjustable elements being set to thereby align the axis of said rotating shaft of the tachometer with the axis of the motor shaft.

* * * * *

UNITED STATES PATENT AND TRADEMARK OFFICE
CERTIFICATE OF CORRECTION

PATENT NO. : 5,258,675

DATED : November 2, 1993

INVENTOR(S) : Jeffrey P. Nelessen

It is certified that error appears in the above-identified patent and that said Letters Patent is hereby corrected as shown below:

Claim 11, column 12, line 10, after "screw" cancel "and" and substitute therefor ---said---.

Signed and Sealed this

Sixteenth Day of August, 1994

Attest:

BRUCE LEHMAN

Attesting Officer

Commissioner of Patents and Trademarks